Feb. 16, 1960  D. V. HOTSON  2,925,550
SYNCHRONOUS CONDENSER CONTROL SYSTEM
Filed July 31, 1957
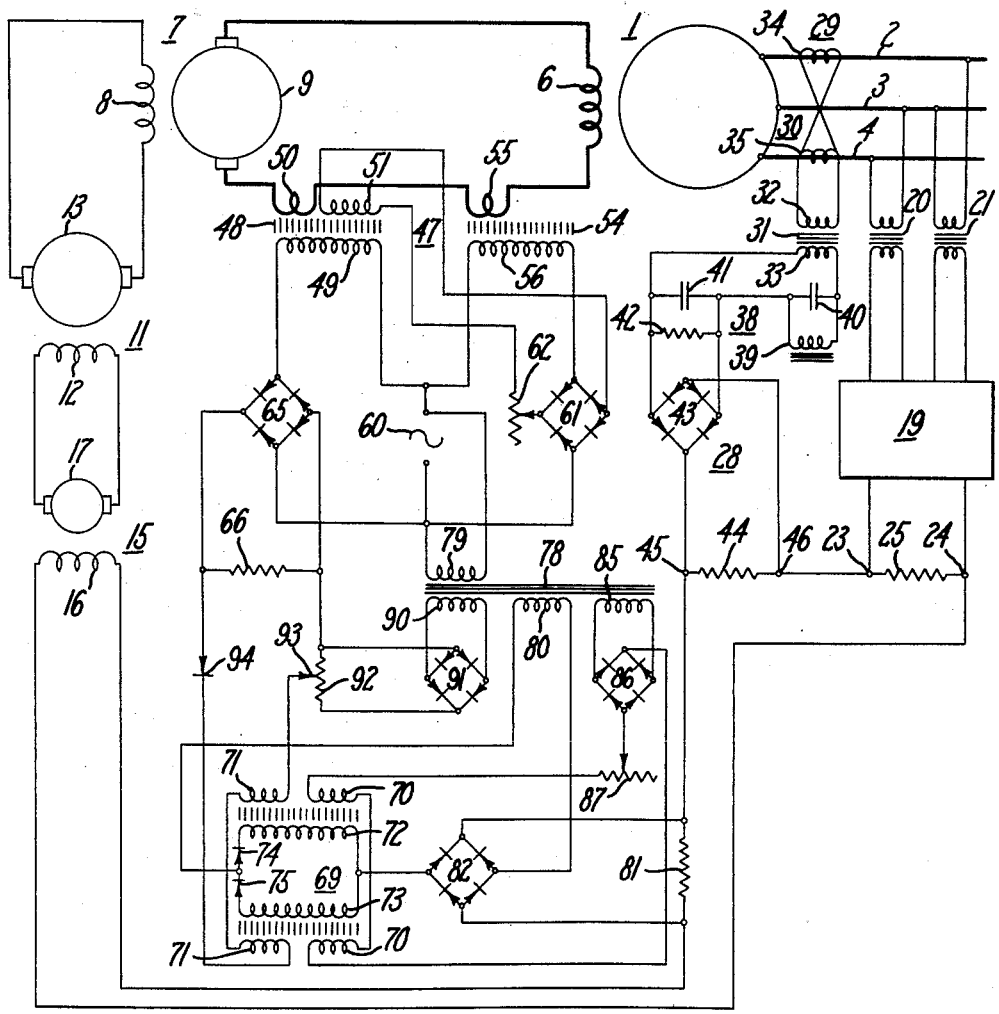
Fig. 1
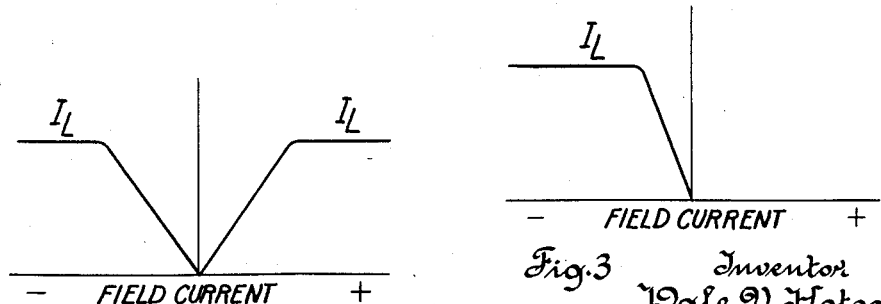
Fig. 2
Fig. 3
Inventor
Dale V. Hotson
by Carl W. Laumann Jr
Attorney

2,925,550

SYNCHRONOUS CONDENSER CONTROL SYSTEM

Dale V. Hotson, Milwaukee, Wis., assignor to Allis-Chalmers Manufacturing Company, Milwaukee, Wis.

Application July 31, 1957, Serial No. 675,493

7 Claims. (Cl. 323—117)

This invention relates in general to control systems for regulating an electrical quantity, and in particular to circuits used to control the field current of a dynamoelectric machine.

Unloaded synchronous machines, commonly referred to as synchronous condensers, are often used to regulate voltage on transmission lines through control of reactive current carried by the line. The term synchronous condenser is probably a misnomer, since a synchronous machine which is made responsive to voltage may function either as a synchronous condenser to draw a leading current from the line and raise the voltage or as a synchronous inductor to draw a lagging current from the line when the line voltage is too high.

The lagging current rating of a synchronous condenser may be increased by operating the machine with a negative field current. When the machine is operated in this manner, it is essential to have a limitation on the amount of negative field current which is permitted to flow to prevent the machine from falling out of synchronism.

It has been found that the relationship of field current to the stability of the machine is independent of the voltage at which the machine is operated. This allows the limits of stable operation to be accurately and simply measured by a current responsive device in the field circuit. In the preferred embodiment of this invention, measurement of the negative field current is accomplished by means of a polarized transductor. This transductor consists basically of two reactors so connected that an output is produced only when the direct current circulating through a conductor common to each core is of a certain polarity. When the negative current flow approaches the maximum allowable for stable operation of the machine, the polarized transductor produces an output. This output modifies the signal produced by the voltage responsive circuit controlling the field exciter. In other words, although the voltage responsive circuit senses a condition which requires the machine field to be excited more nagatively, the negative field current limiter prevents the field current from exceeding the amount allowable for stable operation of the machine.

It is therefore an object of this invention to provide an improved regulating system for a dynamoelectric machine which limits the control voltage supplied to regulate the machine.

It is a further object of this invention to provide a field excitation control system that will limit the field current to a value providing stable operation of the machine.

Another object of this invention is to provide a synchronous condenser control system which increases the lagging current rating of the machine.

Objects and advantages other than those stated above will be apparent from the following description when read in connection with the accompanying drawings, in which:

Fig. 1 is a diagrammatic representation of a regulating system embodying the apparatus and circuits of the invention.

Fig. 2 is a graph showing the relation of output current to field current for a saturable reactor in the system shown in Fig. 1.

Fig. 3 is a graph showing the relation of reactor output current to current flowing in the field winding for another saturable reactor in the system shown in Fig. 1.

Referring to Fig. 1, a synchronous condenser 1 is shown connected to a three phase alternating current system by output conductors 2, 3, 4.

Synchronous condenser 1 is provided with a field winding 6 supplied with direct current excitation from armature winding 9 of main exciter 7. Main exciter 7 has a field winding 8 which is supplied with direct current excitation from armature winding 13 of exciter generator 11. Field winding 12 of exciter generator 11 is supplied with direct current from armature winding 17 of exciter generator 15. Although the field 6 is shown to be supplied with direct current from a rotating exciter, it will be understood that a static exciter of the magnetic amplifier type might be used instead since exciters 7, 11 and 15 function as amplifiers responsive to a control signal.

In the embodiment shown the invention is incorporated in a voltage regulating synchronous condenser. Therefore, a voltage responsive circuit which may be of any suitable type, indicated generally by 19, is connected by means of potential transformers 20 and 21 to the circuit to be regulated. The regulator has output terminals 23 and 24 and is preferably of the type that produces a negative output voltage for deviations above the desired voltage and a positive output voltage for deviations below the desired voltage. The output voltage appears across a load resistor 25 connected to the output terminals 23 and 24.

Current limiter 28 protects against excessive current being drawn by the machine. Input to the current limiter is taken from two current transformers 29 and 30 connected to the condenser output conductors 2 and 4. The isolation transformer 31 has a primary winding 32 energized by the output of the current transformer secondaries 34 and 35 connected in parallel circuit relationship. The vector sum of these two outputs appears across secondary winding 33 of isolation transformer 31 and energizes the resonant circuit 38. As the current in the conductors containing the current transformers 29 and 30 increases, the impressed voltage increases across ferroresonant circuit 38. Below the critical value, the entire voltage is absorbed across the combination of choke 39 and capacitor 40 and no voltage appears across the capacitor 41. Above the critical value of current the circuit voltage increases to the point where the choke saturates and the voltage is transformed to the capacitive portion of the circuit made up of capacitor 41 and resistor 42. This energizes bridge rectifier 43 to produce a D.C. output voltage across resistor 44 connected across current limiter output terminals 45 and 46.

The current limiter output signal is connected with a polarity that opposes the "raise" signal of the voltage regulator. Thus, when the line current reaches the critical point, the normal voltage regulation is superseded and the exciter output current is regulated to a value which produces only the maximum condenser current as determined by the current limiter characteristic.

A problem arises when the voltage increases to the point where the exciter is called upon to deliver a negative field current. Since the limiting factor when a leading current is drawn is the thermal capacity of the machine, the current limiter is set for a value which is beyond the limit of stable operation in the negative field area. The thermal capacity is greater than the lagging current capacity of the machine since the machine becomes unstable before the thermal limit of the machine is reached. To prevent the machine from becoming unstable, a reverse current sensing circuit is incorporated in the field circuit which limits the response of the machine to a "lower" signal.

The reverse current sensing circuit which comprises the current sensing means has a polarized transductor 47 in the field circuit consisting of a saturable reactor 48 having a reactance winding 49, a control winding 50 and an auxiliary winding 51. Another saturable reactor 54 has a control winding 55 and a reactance winding 56. The saturable reactor 54 has its reactance winding energized from a source of alternating current 60. The current flowing in the reactance winding is converted to direct current by the bridge rectifier 61. The output of this saturable reactor is the same for a positive or negative current flowing in the control winding 55 and is illustrated graphically in Fig. 2. As the current in the control winding 55, which is proportional to the current flowing in the field circuit, increases in either direction, the current $I_1$ in the reactance winding increases proportionally.

The output current from this reactor, rectified by the bridge rectifier 61, energizes the auxiliary winding 51 through an adjustable resistor 62. The auxiliary winding 51 is thus traversed by a nonreversible direct current which is proportional to the reversible direct current flowing in the control windings 50 and 55. When the current flow is positive, the magnetomotive force of auxiliary winding 51 is in opposition to the magnetomotive force of control winding 50 and thus no output is obtained from the saturable reactor 48. However, when the current is flowing in a negative direction in the field circuit, the magnetomotive force of the control winding 50 adds to that of the auxiliary winding 51 and the reactor produces an output current. The current flowing in the reactance winding is rectified by the bridge rectifier 65 and appears as a voltage of unchanging polarity across the load resistor 66. The output of this reactor is indicated graphically in Fig. 3 as $I_1$ and is responsive to the polarity and magnitude of the field current. There is no output produced as long as the field current flows in a positive direction but when the current reverses to flow in a negative direction there is an output proportional to field current.

A self-saturating magnetic amplifier 69 with bias windings 70 and control windings 71 has reactance windings 72 and 73 in series with self-saturating rectifiers 74 and 75. Power transformer 78 with a primary winding 79 energized from a source of alternating current 60 has a secondary winding 80 which energizes the reactance windings 72 and 73. The alternating current flowing in the reactance windings is converted to a direct current voltage across the load resistor 81 by bridge rectifier 82. A secondary winding 85 on power transformer 78 energizes the bridge rectifier 86 which is connected on a direct current side to a bias winding 70 through an adjustable resistor 87 which permits the operating point of the amplifier to be adjusted. A secondary winding 90 on the power transformer 78 energizes bridge rectifier 91 to produce a direct current reference voltage across resistor 92. The reference voltage across resistor 92 and the signal voltage across resistor 66 are combined in opposition to energize control windings 71 with the difference of the two voltages. A blocking rectifier 94 prevents the current from flowing in the control winding unless the signal voltage exceeds the reference voltage. Thus, the blocking rectifier 94 suppresses the reference voltage and allows only that portion of the signal which exceeds the reference voltage to produce a current in the control winding. In this manner, no output is produced below a value of negative field current as determined by the setting of variable tap 93 on resistor 92.

The direct current output voltage of bridge rectifier 82, appearing across resistor 81 is of a polarity to oppose the signal voltage from the voltage regulator when the machine voltage is too high and a higher negative current in the field circuit would cause a synchronous condenser to slip a pole and fall out of synchronism. Resistors 25, 44 and 81, across which appear signal voltages of the voltage regulator, the current limiter and negative field current limiter, respectively, are series connected to energize the field winding 16 of exciter generator 15 with the arithmetic sum of the signal voltages.

The output of exciter generator 15 energizes field 12 of exciter generator 11 and the output of exciter generator 11 energizes field 8 of exciter 7 and in this manner the excitation to field 6 is controlled according to the input to exciter generator 16. In this manner the field current is limited on the positive side by the thermal capacity of the machine and on the negative side by the limit of stable operation.

In the embodiment shown, a synchronous condenser is used to regulate the circuit voltage by controlling the reactive drop of the line feeding the circuit. A voltage regulating device is connected to the circuit by means of potential transformers and is of the type which produces a voltage output of reversible polarity. In other words, when the circuit voltage rises above the desired value the voltage regulator produces across resistor 25 an output voltage of a polarity which tends to decrease the field excitation of the synchronous condenser. Conversely, the polarity of the voltage regulator output across resistor 25 is reversed when the circuit voltages decrease, thereby increasing the field excitation of the synchronous machine.

It is possible that circuit conditions will call for an output beyond the limit of the machine. The leading current which may be drawn by the machine is determined by its thermal capacity. In the embodiment shown and described the amount of leading current drawn by the machine is determined by a current limiter connected to the output side of the machine by means of current transformers. This limiter produces a direct voltage which is a measure of current in the conductors with which it is associated. The conventional combination of components is designed to produce a voltage which increases in magnitude abruptly at the point about which regulation is desired. The output voltage of the current limiter appears across resistor 44 in series with resistor 25. The polarity of these two voltages is such that the current limiter output voltage opposes a voltage regulator signal tending to increase the field excitation of the synchronous condenser. In this manner a signal is produced to oppose a voltage regulator signal which would otherwise drive the machine beyond its thermal limit.

In addition to the limitation on leading current imposed by the thermal capacity of the machine, the requirement of stability demands that a limit be placed on the lagging current drawn by the machine. If full use is to be made of the machine, the point at which the machine becomes unstable must be accurately determined and the machine regulated so that this point is never exceeded.

To hold the lagging current drawn by the machine to a value within the limits of stable operation the negative current limiter is connected in the circuit to produce a signal voltage which opposes a voltage regulator signal which would otherwise drive the machine into the region of instability.

Since the field current provides an accurate measure of the stability independent of system voltage, the negative current limiter is made responsive to field current. The two saturable reactors 48 and 54 have control windings 50 and 55 which carry a measure of the field current. The output of the first saturable reactor is fed to an auxiliary winding 51 on the second reactor 48 with a polarity such as the M.M.F. of the auxiliary winding opposes that of the control winding 50 for a positive field current. The second reactor therefore produces essentially no output for values of positive field current since the M.M.F. of the second reactor control winding is balanced by the M.M.F. of the auxiliary winding.

When the field current is of a negative polarity the M.M.F. of the auxiliary winding 51 aids the M.M.F. of the control winding 50 and the second reactor produces an output proportional to negative current through the field.

The output of the second reactor is converted to a direct voltage by rectifier 65 which is connected to energize the control winding 71 of magnetic amplifier 69 through a blocking rectifier 94 in opposition to an adjustable reference voltage. The blocking rectifier, in series with the voltages across resistors 66 and 92 and the control winding 71 suppresses the reverse flow of current through the control winding which would otherwise exist when the reference voltage across resistor 92 exceeds the direct voltage output of the second reactor across resistor 66. The adjustable reference voltage allows a setting to be made so that no output is obtained from the magnetic amplifier until a predetermined value of negative field current is reached. At this point, any further increase in negative field current results in an output from the magnetic amplifier.

The A.C. output of the magnetic amplifier is converted to a direct voltage by means of a rectifier 82. This direct voltage appears across a third resistor 81 connected in series with the first resistor 25 and second resistor 44, across which appear the voltage regulator output and the leading current limiter.

These three resistors and the voltages across them make up the energization circuit for the exciter generator field. These three voltages are therefore determinative of the current in the exciter generator field.

Normally the current limiter will have no output so the corrective voltage across its load resistor will be essentially zero. The same is true of the negative current limiter since only extreme conditions call for a large lagging current. Therefore, voltage across the voltage regulator load resistor will determine the current flowing in the exciter generator field. Should the leading current become excessively high the current limiter develops a signal which opposes that of the voltage regulator. An excessive amount of lagging current causes the negative current limiter to develop a voltage across its load resistor which opposes that of the voltage regulator. In this manner the current limiter and negative current limiter combine to protect the machine at opposite limits of its operating range.

It will be apparent to those skilled in the art that various changes and modifications may be made in the embodiments of the invention illustrated and described herein without departing from the spirit of the invention or from the scope of the appended claims.

What is claimed is:

1. In a dynamoelectric machine having a field winding, a field current limiter comprising current sensing means in circuit with said field of said dynamoelectric machine to produce an output voltage responsive directly to the polarity and magnitude of the current flowing in said field, means responsive to said output voltage to limit the negative current excitation to said field.

2. In a dynamoelectric machine having a field winding, a field current limiter comprising a polarized transductor in circuit with said field winding of said dynamoelectric machine to produce an output voltage responsive directly to the polarity and magnitude of the current flowing in said field, means responsive to said output voltage to limit the negative current excitation to said field.

3. In a dynamoelectric machine having a field winding, exciter means for supplying said field winding of said dynamoelectric machine with direct current, a polarized transductor in circuit with said field winding and exciter means for producing an output voltage responsive directly to the polarity and magnitude of the direct current flowing in said field winding; exciter control means responsive to said output voltage to limit the negative direct current supplied to said field winding.

4. In a regulating system for maintaining an electrical quantity of an electrical system substantially constant, the combination of means responsive to variations in said electrical quantity from a predetermined value for producing a first control voltage, means responsive to said first control voltage for producing a reversible output current to control said electrical quantity, direct current sensing means responsive in polarity and magnitude to said output current at a predetermined value for opposing said control voltage.

5. In a regulating system for maintaining an electrical quantity of an electrical system substantially constant, the combination of means responsive to variations in said electrical quantity from a predetermined value for producing a first control voltage, an alternating current machine connected to said system and affecting said electrical quantity, said machine having a field winding, exciter means for supplying a reversible direct current to said field winding, reverse current sensing means in circuit with said field for producing a second control voltage at a predetermined value of reverse current, said exciter means having a field energized by the combination of said first and second control voltages.

6. In a regulating system for maintaining an electrical quantity of an electrical system substantially constant, the combination of means responsive to variations in said electrical quantity from a predetermined value for producing a first control voltage, an alternating current machine connected to said system, said machine having a field winding, said exciter means having a control field; means for supplying a reversible direct current to said field winding, said excited means having a control field; a first saturable reactor having a first reactance winding, a first control winding and an auxiliary winding; a second saturable reactor having a second reactance winding and a second control winding; a source of alternating current and means connecting said reactance windings thereto; means connecting said control windings to said field circuit to cause said first and second control windings to be traversed by a measure of the direct current flowing in said field winding; means for rectifying the current in said second reactance winding to supply said auxiliary winding with a nonreversible direct current proportional to said direct current flowing in said field winding; means for rectifying the current in said first reactance winding to produce a second control voltage responsive to the reverse current flowing in said field winding, resistor means energized by said first and second control voltages; means connecting said exciter control field to be energized by the combination of voltage appearing across said resistor means.

7. In a regulating system for maintaining an electrical quantity of an electrical system substantially constant, the combination of means responsive to variations in said electrical quantity from a predetermined value for producing a first control voltage; an alternating current machine connected to said system, said machine having a field winding, a field energization circuit including exciter means for supplying a reversible direct current to said field, said exciter means having a control field; a first saturable reactor having a first reactance winding, a first control winding and an auxiliary winding; a second saturable reactor having a second reactance winding and a second control winding; a source of alternating current and means connecting said reactance windings thereto; means connecting said control windings to said field circuit to cause said first and second control windings to be traversed by a measure of the direct current flowing in said field winding; circuit means including rectifying means to supply said auxiliary winding with a nonreversible direct current porportional to said direct current flowing in said field winding; means for rectifying the current in said first reactance winding to produce a second control voltage responsive to the reverse current flowing in said field winding; a third saturable reactor having a third reactance winding and a third control winding, a source of alternating current and means connecting said reactance winding thereto, circuit means for producing a direct current voltage and connecting said second control voltage and said direct voltage in opposition to energize said third control winding with a signal voltage dependent on the difference of said voltages and means for suppressing the difference of said voltages when said direct voltage exceeds said second control voltage; means for rectifying the current flowing in said third reactance winding to produce a third control voltage which varies abruptly at a predetermined value of negative field current, means connecting said exciter control field to be energized by the combination of said first and third control voltages in opposition to limit the negative field current produced by said exciter.

References Cited in the file of this patent

UNITED STATES PATENTS

| | | |
|---|---|---|
| 1,947,289 | Evans | Feb. 13, 1934 |
| 2,666,885 | Bradley et al. | Jan. 19, 1954 |

UNITED STATES PATENT OFFICE

CERTIFICATE OF CORRECTION

Patent No. 2,925,550            February 16, 1960

Dale V. Hotson

It is hereby certified that error appears in the printed specification of the above numbered patent requiring correction and that the said Letters Patent should read as corrected below.

Column 6, line 32, after "winding," insert -- a field energization circuit including exciter means for supplying a reversible direct current to said field winding, --; lines 33 and 34, strike out "means for supplying a reversible direct current to said field winding, said excited means having a control field;".

Signed and sealed this 9th day of August 1960.

(SEAL)
Attest:

KARL H. AXLINE            ROBERT C. WATSON

Attesting Officer           Commissioner of Patents